(12) United States Patent
Kangas et al.

(10) Patent No.: US 8,812,017 B2
(45) Date of Patent: Aug. 19, 2014

(54) METHOD AND ARRANGEMENT IN A TELECOMMUNICATION SYSTEM

(75) Inventors: Ari Kangas, Lidingö (SE); Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 699 days.

(21) Appl. No.: 13/132,519

(22) PCT Filed: Jun. 17, 2009

(86) PCT No.: PCT/SE2009/050754
§ 371 (c)(1),
(2), (4) Date: Jun. 2, 2011

(87) PCT Pub. No.: WO2010/064969
PCT Pub. Date: Jun. 10, 2010

(65) Prior Publication Data
US 2011/0244884 A1    Oct. 6, 2011

Related U.S. Application Data

(60) Provisional application No. 61/120,219, filed on Dec. 5, 2008.

(51) Int. Cl.
*H04W 88/02* (2009.01)
*G01S 5/12* (2006.01)
*G01S 5/02* (2010.01)
*H04W 64/00* (2009.01)

(52) U.S. Cl.
CPC ... *G01S 5/12* (2013.01); *G01S 5/02* (2013.01); *H04W 64/00* (2013.01)
USPC ..................................... 455/456.1

(58) Field of Classification Search
USPC .......................... 455/0.1–456.6; 370/328–338
See application file for complete search history.

(56) References Cited

U.S. PATENT DOCUMENTS

| 5,657,487 | A | 8/1997 | Doner |
| 6,894,644 | B2 | 5/2005 | Duffett-Smith et al. |
| 7,013,147 | B1 | 3/2006 | Kuwahara et al. |
| 7,155,237 | B2 * | 12/2006 | Porcino ...................... 455/456.5 |
| 8,447,323 | B2 * | 5/2013 | Wang ......................... 455/456.1 |
| 2005/0200525 | A1 | 9/2005 | Duffett-Smith et al. |

FOREIGN PATENT DOCUMENTS

| EP | 1699195 A1 | 9/2006 |
| JP | 2001166026 A | 6/2001 |
| JP | 2004536312 A | 12/2004 |
| JP | 2005537695 A | 12/2005 |

(Continued)

OTHER PUBLICATIONS

U.S. Appl. No. 61/094,851, filed on Sep. 5, 2008.*

(Continued)

*Primary Examiner* — Diane Mizrahi
(74) *Attorney, Agent, or Firm* — Coats & Bennett, PLLC

(57) ABSTRACT

The present invention provides a method and apparatus for enhancing signal measurements for positioning in a device (22) of a telecommunication network. The method comprises receiving a plurality of transmissions from a plurality of cells, at least partially cancelling a transmission from a first cell of the plurality of cells, and then attempting to detect a transmission from a second cell of the plurality of cells. Timing measurements may then be taken from the plurality of received transmissions to enable the position of the device to be determined.

19 Claims, 5 Drawing Sheets

(56) References Cited

FOREIGN PATENT DOCUMENTS

| WO | 96/31076 | 10/1996 |
| WO | 97/27711 | 7/1997 |
| WO | 99/57932 | 11/1999 |
| WO | WO 99/57932 | * 11/1999 ............... H04Q 7/38 |

OTHER PUBLICATIONS

Enhance Downlink POsitioning in WiMAX/16m Shu Wang, Ki-Dong Lee, Sang G. Kim and Jin Sam Kwak LG Electronics.*

* cited by examiner

METHOD AND ARRANGEMENT IN A TELECOMMUNICATION SYSTEM

FIELD OF THE INVENTION

The present invention relates to methods and arrangements in a telecommunication system, in general to a method of and an apparatus for detecting signals from one or more cells that are not the cells with the strongest signals, and in particular to position detection in a telecommunication system.

BACKGROUND

The possibility of determining the position of a mobile device in a wireless telecommunication network has enabled application developers and wireless network operators to provide location based, and location aware, services. Examples of those include guiding systems, shopping assistance, friend finder, presence services, community and communication services and other information services giving the mobile user information about their surroundings.

In addition to these commercial services, the governments of several countries have put requirements on network operators to be able to determine the position of an emergency call. For instance, the governmental requirements in the USA (FCC E911) state that it must be possible to determine the position of a certain percentage of all emergency calls. The requirements make no distinction between indoor and outdoor environments.

In outdoor environments, the position estimation can be done using positioning systems, e.g. GPS (Global Positioning System) based methods like Assisted-GPS (A-GPS). Position estimation can also be performed using the wireless network itself. Methods using the wireless network can be arranged into two main groups: those using measurements from a single radio base station, and those using measurements from a plurality of radio base stations.

The first group comprises methods that are based on the radio cell to which a mobile terminal is attached, e.g. by using Cell-ID or a combination of cell-ID and Timing Advance (TA). The TA measurement principle is depicted in FIG. 1.

A radio base station 10 serves three radio cells 12a, 12b, 12c. Although three cells are depicted in this example, in general each radio base station will serve one or more radio cells. In order to determine the location of a mobile terminal 14, the travel time of radio waves from the radio base station 10 to the mobile terminal 14 and back is measured. The distance r from radio base station 10 to mobile terminal 14 then follows from the formula:

$$r = c\frac{TA}{2}$$

where TA is the round trip time and where c is the speed of light.

The round trip time measurement alone defines a circle, or if the inaccuracy is accounted for, a circular strip around the radio base station 10 (more accurately, a sphere, or spherical shell) is defined. By combining this information with the cell polygon, angular extent of a part-circular strip 16 that defines the possible position of the mobile terminal 14 can be computed.

In several systems, therefore, among those Release 8 of the 3GPP specifications (also known as long term evolution, or LTE), the round trip time TA can be used to identify the distance from the antenna at which a mobile terminal is positioned. However, it is not possible using this method to ascertain where exactly in the sphere or sector the UE is. If TA measurements determine that the mobile terminal is for example 500 m from the radio base station, this is along an arc in a sector or circumference of a circle.

To overcome this problem, a second group of methods uses round trip time measurements from a plurality of radio base stations. By determining its distance from a plurality of radio base stations, a mobile terminal can more accurately triangulate its position.

However, modern telecommunications systems are designed to provide high data rates in the downlink and the uplink (i.e. in communications to and from the mobile terminal). It is also desirable to reduce power usage in the mobile terminal, in order to prolong the battery life as much as possible. Both of these requirements mandate a high quality radio link between the mobile terminal and its serving radio base station (i.e. the radio base station associated with the mobile terminal's serving radio cell). Thus, interference from other neighbouring radio base stations should be kept to a minimum, and in modern telecommunication systems this is very successfully achieved. A mobile terminal wishing to determine its location, however, may have difficulty in detecting signals from neighbouring radio base stations for this very reason.

What is required, therefore, is a method whereby a mobile terminal can detect signals from radio base stations other than its serving radio base station, for example, in order to determine its location.

SUMMARY

Currently no timing-based positioning solution has been specified for the long-term evolution (LTE) of the UTRAN (E-UTRAN). A straightforward approach would be to mimic the methods used in previous generations of cellular systems. However, as will be outlined in the following, these methods would be faced with coverage problems, e.g. due to too low carrier to interference ratio (C/I), unless certain measures are taken, which were not needed in previous cellular systems since the air interfaces had different characteristics.

One or more embodiments herein at least partially cancel signals received from a cell with relatively high signal strength, so that signals from cells with relatively low signal strength can be more easily detected.

For example, in one aspect of the present invention, there is provided a method of enhancing signal measurements for positioning in a device of a telecommunications system. The telecommunications system further comprises a plurality of cells served by one or more radio base stations, the plurality of cells comprising at least a first cell and one or more second cells. The method comprises receiving a plurality of transmissions from the plurality of cells; at least partially cancelling, from the plurality of received transmissions, a transmission from the first cell, generating one or more remaining transmissions; attempting to detect, from the one or more remaining transmissions, a transmission from the one or more second cells; and taking timing measurements from the plurality of received transmissions.

The first cell may be the serving cell of the device, or a neighbouring cell. Further, the first and second cells may be maintained by the same radio base station or different radio base stations.

In embodiments of the invention, the transmissions may comprise any of reference signals, synchronization signals, or dedicated positioning reference signals.

In another embodiment of the invention, the device at least partially cancels the transmission from the first cell by estimating the channel between the device and the first cell, generating an estimated transmission, and subtracting the estimated transmission from the received plurality of transmissions.

Other objects, advantages and novel features of the invention will become apparent from the following detailed description of the invention when considered in conjunction with the accompanying drawings.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
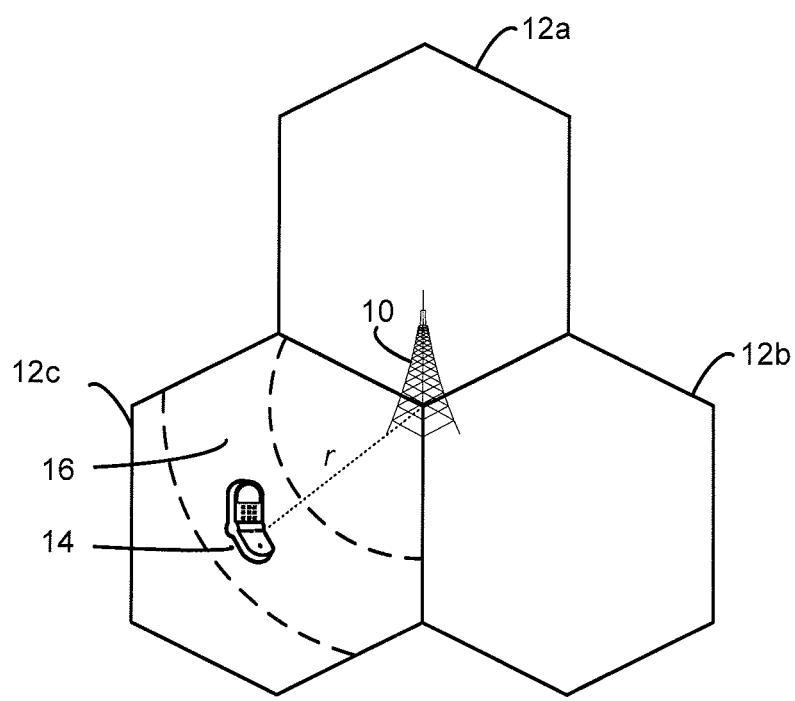
FIG. 1 illustrates a method of determining the position of a terminal in a telecommunications network.
Figure 2:
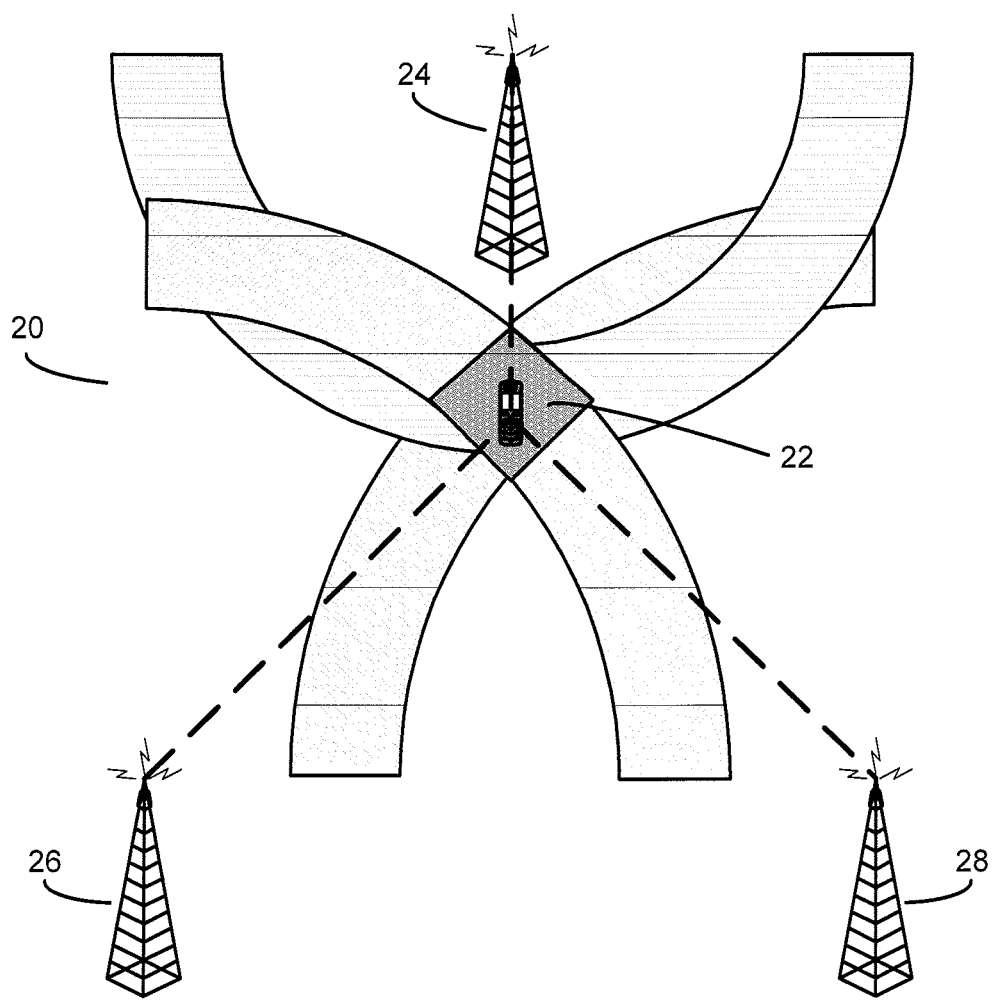
FIG. 2 illustrates a method of determining the position of a terminal in a telecommunications network according to embodiments of the present invention.

FIG. 2 shows a telecommunication system 20.

The telecommunication system 20 may be, for example, an evolved universal terrestrial radio access network (E-UTRAN) for use with Release 8 or any later release of the 3GPP specifications, or any other wireless telecommunication network such as CDMA2000, GSM, WLAN, etc.

The system 20 comprises a device 22, which in the illustrated example is a mobile terminal, also called a user equipment or mobile station. The invention is also applicable to stationary terminals.

The system 20 further comprises a plurality of radio base stations 24, 26, 28, of which three are shown here. One of the radio base stations, referenced 24, is the serving radio base station, which maintains the particular radio cell with which the device 22 is registered, as will be appreciated by those skilled in the art. Moreover, each radio base station 24, 26, 28 may maintain more than one radio cell. In operation, therefore, the device 22 primarily sends transmissions to (uplink), and receives transmissions from (downlink), the serving cell, which is maintained by the serving radio base station 24.

The device 22 may also be able to detect signals from neighbouring radio base stations 26, 28 or signals from cells that are not the serving cell; however, these signals will in general be much weaker than those from the serving radio base station 24.

As previously mentioned, at certain instances it is useful to determine the geographical location of the device 22. This may be instigated by the device 22 itself, or by the network, for example if the device 22 is making an emergency call. In the latter case, the device 22 receives an instruction from the serving radio base station 24 to determine its location.

When determining its location, in one embodiment the device 22 takes time of arrival (TOA) measurements from each of the radio base stations 24, 26, 28 in its vicinity. The measurements allow the device 22 to determine a measure of the distance (in practice, a pseudo-distance) from each radio base station, in effect generating circles (or circular strips, taking into account inaccuracy in the measurements) whose radii is equal to the distance, or pseudo-distance, of the device 22 from each respective radio base station. The use of "pseudo-distance" arises because of the receiver clock bias in the device 22 (see equations (1a) to (1n) below). In such an embodiment, the absolute distance from each radio base station is not measured. The device 22 can then determine its location as being at the intersection of these circles.

The TOA principle can be written in mathematical form as follows.

$$t_R^1 = t_T^1 + \sqrt{(x-x_1)^2 + (y-y_1)^2} \big/ c + b + v^1 \quad (1a)$$

$$t_R^2 = t_T^2 + \sqrt{(x-x_2)^2 + (y-y_2)^2} \big/ c + b + v^2 \quad (1b)$$

$$\ldots$$

$$t_R^N = t_T^N + \sqrt{(x-x_N)^2 + (y-y_N)^2} \big/ c + b + v^N \quad (1n)$$

where:

$t_R^i$: Time of reception by the device for the ith base station (measured)

$t_T^i$: Time of transmission from the ith base station $x_i, y_i$: Coordinates of ith base station c: Speed of light x, y: Coordinates of MS computed by solving equations (at MS or in network node)

b: receiver clock bias $v^i$: Measurement error of ith timing measurement $t_T^i$ may be provided to the device 22 in a number of ways. For example, $t_T^i$ may be provided with assistance data, or known to the device 22 in a synchronized network. The coordinates of the ith base station, $x_i$ and $y_i$, are known in the network, and may be transmitted to the device 22, or the device 22 could maintain a local database of base station coordinates.

It will be apparent to those skilled in the art that in remote telecommunication systems, where a radio base station serves one or more cells using antennas that are remote from the location of the radio base station, it is the coordinates of the antennas that are important for these calculations.

The equations (1a) to (1n) can be solved for the unknowns (x, y, b) whenever n≥3 and the geometry of the base stations is good, i.e. spaced such that the device 22 has to look in a different direction for each base station. One method of solving the equations is to use numerical optimization solutions based on Taylor series expansions of equations (1a) to (1n), although alternative methods are well known in the art.

The equations (1a) to (1n) may be solved in the device 22 itself, or remotely in the network, in which case the device 22 transmits the timing measurements to the network via the serving base station 24.

In addition to the TOA-based method described above, alternative methods of positioning will be known to those skilled in the art. For example, time difference of arrival (TDOA) methods measure the difference in arrival times at different base stations of a pulse signal transmitted by the device 22. Adapting equations (1a) to (1n) for TDOA methods is straightforward for those skilled in the art.

Positioning using a timing-based method therefore requires that the timing of at least three geographically dispersed radio base stations is measured. It is necessary to ensure that the signal-to-noise ratio (SNR) to the third strongest base station is strong enough so that it can still be detected by the device 22. Cellular systems which reuse the same frequency band are designed to create strong isolation between cells, meaning that the signal from the own serving cell should be strong while interference from the neighbouring base stations should be minimized. This means that the requirements for positioning and communication are conflicting. Since modern telecommunication systems are primarily for communication, time measurements for positioning need to be done at very low C/I (carrier to interference ratio) to neighbouring base stations, which puts high requirements on the device receiver and also typically degrades the positioning accuracy. For example, in a setup that minimizes inter-cell interference the C/I to the third base station may be very low, −23 dB at the 5% level for the third strongest base station.

In other circumstances, transmissions from a neighbouring cell may be strongest and prevent the device 22 from detecting signals from a third base station, or even from the serving radio base station 24.

According to embodiments of the present invention, to overcome these problems, the device 22 suppresses signals received from a first radio base station so that it can better detect the weaker signals from second radio base stations, for example suppressing the signals received from the serving radio base station 24 so that it can better detect signals from neighbouring radio base stations 26, 28. This method has particular utility when determining the location of the device 22 because it enables the device 22 to detect the multiple signals necessary for location determination.

Figure 3:
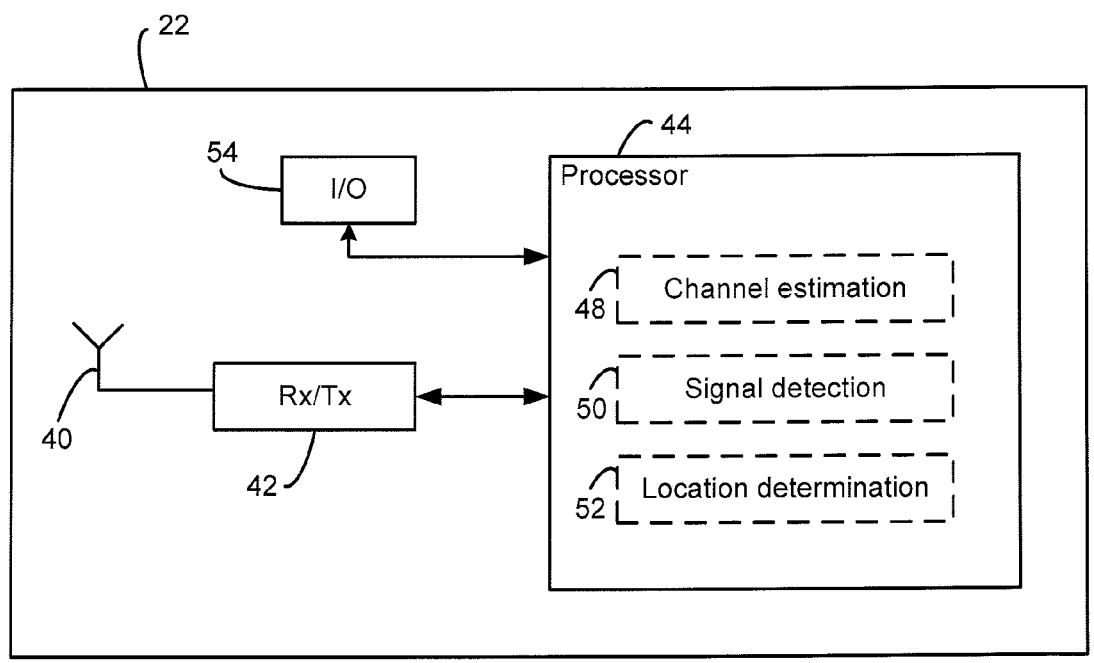
FIG. 3 illustrates a device according to embodiments of the present invention.

FIG. 3 shows a device 22 according to embodiments of the present invention. In one embodiment, the device 22 is a terminal.

The device 22 comprises an antenna 40 coupled to Rx/Tx circuitry 42. Coupled to the Rx/Tx circuitry 42 is a processor 44 that comprises a channel estimation block 48, a signal detection block 50, and a location determination block 52. Also coupled to the processor 44 is input/output circuitry 54 for receiving inputs from and providing outputs to the user of the device 22.

In operation, the antenna 40 receives transmissions and passes these to the Rx/Tx circuitry 42. The Rx/Tx circuitry 42 demodulates the transmissions and passes them to the processor 44 for decoding. Precise operation of the device 22 will be described in greater detail below It will be apparent to those skilled in the art that numerous features usually present in telecommunication devices, where they are not essential to an understanding of the present invention, have not been illustrated for the purposes of clarity. It will also be apparent that various alternative features may be employed than those in this illustrated embodiment. For example, the device 22 may comprise more than one antenna, allowing for multiple-input, multiple-output (MIMO) communications. More than one corresponding Rx/Tx circuitry may also be provided. The function of the elements defined in the processor 44 may be performed by a single processor unit, or by different processor units.

Figure 4:
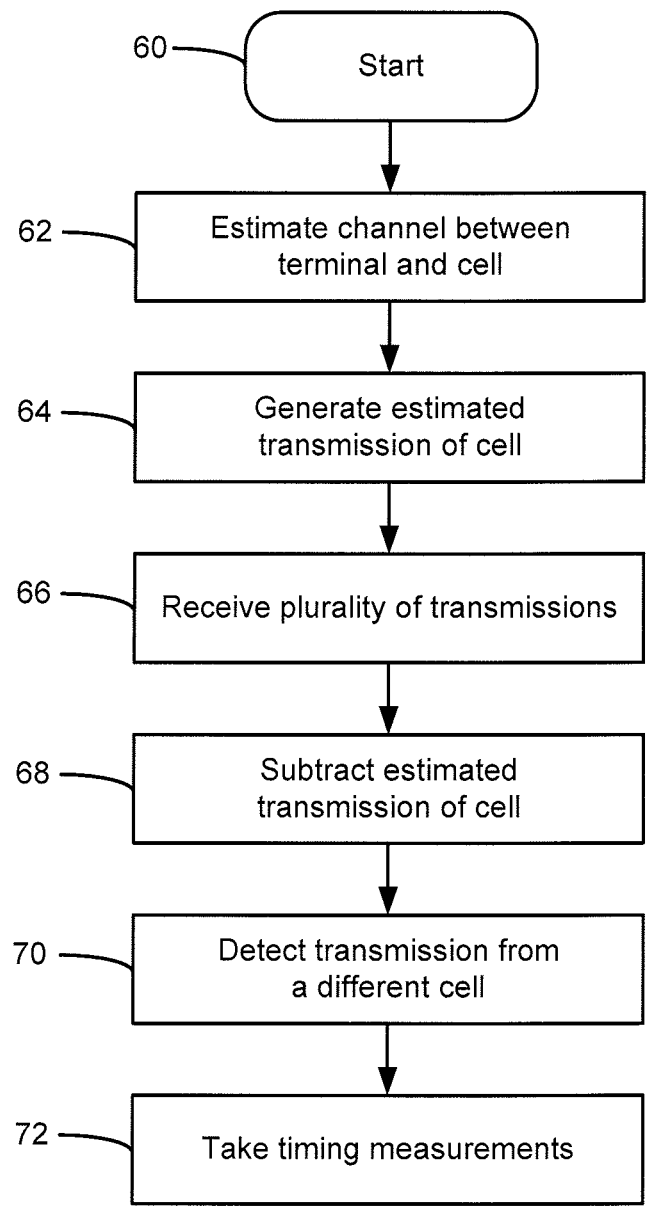
FIG. 4 is a flowchart of a method according to embodiments of the present invention.

FIG. 4 is a flowchart of a method according to embodiments of the present invention.

The method begins in step 60.

In step 62, the device 22 estimates the channel between it and a first cell, for example its serving cell, or nearest neighbouring cell. In one embodiment, the antenna 40 receives transmissions from the serving cell in order to maintain and support its connection with the network. For example, such transmissions may include reference signals, synchronization signals, dedicated positioning reference signals, etc. The device 22 knows the "ideal" form of the signals (i.e. the reference signals as transmitted by the serving radio base station) and so can then determine the effect of the channel on the received transmission. The device 22 may also be able to detect such signals from neighbouring cells, if the signal to noise ratio is sufficient (for example if the SNR is above a threshold value). With its knowledge of the reference signals, synchronization signals, dedicated positioning reference signals, etc, used by those cells, the device 22 can then estimate the channel with those neighbouring cells. Thus, channel estimation may be performed using any signal where the form of the signal is known beforehand by the device 22. This operation is performed by the channel estimation block 48 in the processor 44.

Figure 5:
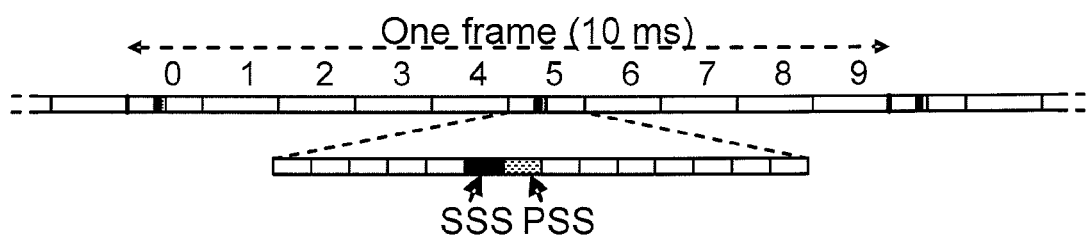
FIG. 5 illustrates synchronization signals employed in embodiments of the present invention.

In Release 8 of the 3GPP specifications, synchronization signals are transmitted in subframes 0 and 5 as illustrated in FIG. 5. The primary synchronization signal (PSS) is transmitted in the last OFDM symbol and the secondary synchronization signal (SSS) in the penultimate OFDM symbol of a subframe. There are three different PSS sequences and 168 different SSS sequences. The sequence identities are used to distinguish different cells. The identity of the cell then can be used to determine the reference signal sequence and its allocation in the time-frequency grid. The synchronization signals occupy 62 resource elements in the centre of the allocated bandwidth.

Also in Release 8 of the 3GPP specifications, reference symbols are transmitted on certain resource elements in every subframe and over the entire bandwidth. They are therefore very suitable for use in channel estimation, especially when the timing measurements are to be performed on other signals, e.g. dedicated positioning reference signals that may be provided in later releases. The dedicated positioning reference signals could themselves be used for channel estimation. The reference signals may be general, or cell-specific.

In step 64, the device 22 generates an estimate of a signal to be received by the device 22 from the first cell. In one embodiment, the estimated signal may be the same signal type as used to perform channel estimation. However, in other embodiments, it may be more suitable to perform channel estimation using one type of signal and generate a different type of estimated signal using that channel estimate. For example, reference signals may be particularly well spread throughout the resources of the channel, and so provide a better signal to perform channel estimation on, i.e. making the channel estimate more robust. A different type of signal (for example one located in a more precise area of the channel resources) may then be estimated using that more robust channel estimate. As with channel estimation, any signal where the device 22 knows the type of signal as it was transmitted by the radio base station is suitable for this purpose. For example, the estimated signal may be an estimate of a reference signal, a synchronization signal and/or a dedicated positioning reference signal.

In the telecommunication network, the radio base stations may be substantially synchronized, so that certain transmissions from one radio base station take place at substantially the same time as those transmissions from other radio base stations. For example, in one embodiment, reference signals, synchronization signals and/or dedicated positioning reference signals may be transmitted by each radio base station at the same time. If the telecommunication network is unsynchronized, transmissions from multiple base stations may still be received by the device 22 at substantially the same time.

In step 66, then, the device 22 receives a plurality of transmissions from a plurality of cells. For example, the device 22 may receive a transmission from the first cell (e.g. the serving cell), as well as at least one transmission from at least one second cell (e.g. a neighbouring cell). The transmissions may include, in one embodiment, any of reference signals, synchronization signals and/or dedicated positioning reference signals. The transmissions are received at substantially the same time, so that it is difficult to detect weaker signals in the light of more dominant, stronger signals from, for example, the serving cell or nearest neighbouring cell.

In step 68, the estimated signal is subtracted from the received plurality of transmissions. For example in one embodiment, where the received plurality of transmissions includes a plurality of reference signals, the estimated reference signal of the first cell is subtracted from the received plurality of transmissions. In another embodiment, where the received plurality of transmissions includes a plurality of synchronization signals, the estimated synchronization signal of the first cell is subtracted from the received plurality of transmissions. In a further embodiment, where the received plurality of transmissions includes a plurality of dedicated positioning reference signals, the estimated dedicated positioning reference signal of the first cell is subtracted from the received plurality of transmissions.

Thus, after subtracting the estimated signal energy of the transmission from the first cell, at least one residual signal is left which contains the generally weaker transmission from the at least one second cell.

It will also be clear to those skilled in the art that step 64 may be performed after the plurality of transmissions is received in step 66. All that is required is that the signal is estimated before it is subtracted from the received plurality of transmissions.

In step 70, the device 22 attempts to detect the transmission of the at least one second cell from the at least one residual signal. This is performed by the signal detection block 50 in the processor 44. However, the task of finding the transmission of the second cell(s) is made much easier because the dominant signal from the first cell has been at least partially cancelled in step 68.

It is possible that the device 22 may be able to detect signals from more than one cell with sufficient energy such that it can perform channel estimation and signal subtraction also for these other cells. Therefore, in these embodiments, steps 62, and 64 may be repeated for those further cells. The estimated transmission of the further cell may then be subtracted from the remaining residual signals such that transmissions from the first cell and the next most interfering cell are at least partially cancelled.

However, in most cases, it should be sufficient to subtract solely the estimated transmission of the first cell (e.g. the dominant cell) in order to be able to detect the signals from second cells.

The method proceeds to step 72. In order to determine its precise location (within errors), the device 22 requires signals from at least three radio base stations, e.g. its serving radio base station 24 plus at least two neighbouring radio base stations 26, 28. If the geometry is bad, however, more signals may be needed. The device 22 takes timing measurements from each of the detected transmissions in the plurality of transmissions, i.e. transmissions from the strongest cell (before it is at least partially cancelled) and from the transmissions detected in step 70.

The device 22 may proceed as shown in FIG. 2, using the location determination block 52 to take timing measurements from each signal and to solve the equations (1a) to (1n) as described above (or alternatively to solve TDOA equations, or another method of determining the location based on timing measurements). The device may determine its location itself, in which case this may be output simply to the user of the device 22, or transmitted to the telecommunications network via the serving radio base station 24. The network may then use this information to locate the user in the event of an emergency call, or to provide location-based services as previously described. Alternatively, the timing measurements may be transmitted directly to the serving radio base station 24, which itself solves the equations (1a) to (1n) to determine the location of the device 22. In another embodiment, a core network of the telecommunications network may solve the equations (1a) to (1n) to determine the location of the device 22.

With standardized cell-specific reference signals, different cells can use six different shifts in frequency and 504 different signals exist. In practice there is a reuse 3 pattern for reference symbols (when assuming two Tx antennas). For low load scenarios, therefore, the interference could then be favourable for time measurements on reference signals; for high load scenarios the situation becomes similar to that for synchronization signals. However, dedicated positioning reference signals may be provided for this purpose.

There is therefore provided a method in a device for detecting signals from neighbouring radio base stations by suppressing signals received from a dominant interferer, e.g. the serving radio base station or a neighbouring cell. The method may be employed, for example, when attempting to determine the position of the device, by enabling timing measurements to be taken from the plurality of received transmissions.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of enhancing signal measurements for positioning in a device of a telecommunications system, the telecommunications system further comprising a plurality of cells served by one or more radio base stations, the plurality of cells comprising at least a first cell and one or more second cells, the method comprising:
   receiving a plurality of transmissions from the plurality of cells;
   at least partially cancelling, from the plurality of received transmissions, a transmission from the first cell, generating one or more remaining transmissions;
   attempting to detect, from the one or more remaining transmissions, a transmission from the one or more second cells; and
   taking timing measurements from detected ones of the received transmissions to enable the position of the device to be determined.

2. The method of claim 1, further comprising:
   estimating a channel between the device and the first cell; and
   using the estimated channel to generate an estimated transmission from the first cell.

3. The method of claim 2, wherein said channel is estimated using one or more of reference signals, synchronization signals, and dedicated positioning reference signals transmitted from the first cell to the device.

4. The method of claim 2, wherein said at least partially cancelling comprises subtracting the estimated transmission from the plurality of received transmissions.

5. The method of claim 1, wherein said transmissions comprise one or more of: reference signals, synchronization signals and dedicated positioning reference signals.

6. The method of claim 1, wherein the plurality of cells comprises at least two second cells, and wherein the one or more remaining transmissions comprises two or more remaining transmissions, the method further comprising:

at least partially cancelling, from the two or more remaining transmissions, a transmission from one of the at least two second cells, generating one or more further remaining transmissions; and attempting to detect, from the one or more further remaining transmissions, a transmission from another one of the two or more second cells.

7. The method of claim 1, further comprising determining the position of the device from said timing measurements.

8. The method of claim 1, further comprising transmitting said timing measurements to a serving cell for the device.

9. The method of claim 1, wherein the first cell comprises a serving cell for the device.

10. The method of claim 1, wherein the transmission from the first cell has a relatively high signal strength and the one or more remaining transmissions have relatively low signal strengths.

11. A device for use in a telecommunications system, the telecommunications system further comprising a plurality of cells served by one or more radio base stations, the plurality of cells comprising at least a first cell and one or more second cells, the device comprising:

at least one antenna configured to receive a plurality of transmissions from the plurality of cells; and a processor configured to:

at least partially cancel, from the plurality of received transmissions, a transmission from the first cell, generating one or more remaining transmissions, attempt to detect, from the one or more remaining transmissions, a transmission from the one or more second cells, and take timing measurements from detected ones of the received transmissions to enable the position of the device to be determined.

12. The device of claim 11, wherein the processor is further configured to estimate a channel between the device and the first cell, and to use the estimated channel to generate an estimated transmission from the first cell.

13. The device of claim 12, wherein the at least one antenna is configured to receive one or more reference signals from the first cell, and wherein the processor is configured to estimate the channel using said one or more reference signals.

14. The device of claim 12, wherein the processor is configured to at least partially cancel the transmission from the first cell by subtracting the estimated transmission from the plurality of received transmissions.

15. The device of claim 11, wherein said transmissions comprise one or more of: reference signals, synchronization signals and dedicated positioning reference signals.

16. The device of claim 11, wherein the processor is further configured to determine the position of the device from said timing measurements.

17. The device of claim 11, wherein the at least one antenna is further configured to transmit said timing measurements to a serving cell for the device.

18. The device of claim 11, wherein the first cell comprises a serving cell for the device.

19. The device of claim 11, wherein the transmission from the first cell has a relatively high signal strength and the one or more remaining transmissions have relatively low signal strengths.

* * * * *